(12) United States Patent
Huang

(10) Patent No.: US 6,237,226 B1
(45) Date of Patent: May 29, 2001

(54) KITCHEN UTENSIL HAVING A LENGTH ADJUSTING DEVICE

(76) Inventor: Su-Chen Huang, No. 2-1, San Min 2nd St., Tu Cheng Li, Tali City, Taichung Hsin (TW)

( * ) Notice: Subject to any disclaimer, the term of this patent is extended or adjusted under 35 U.S.C. 154(b) by 0 days.

(21) Appl. No.: 09/009,638

(22) Filed: Jan. 20, 1998

(51) Int. Cl.[7] .................................................... A47J 43/28
(52) U.S. Cl. .............................................. 30/322; 30/324
(58) Field of Search .............................. 30/322–328, 162, 30/335; 24/628, 664, 665, 672; 16/113.1, 429

(56) References Cited

U.S. PATENT DOCUMENTS

| | | | |
|---|---|---|---|
| 3,897,611 | * | 8/1975 | Booth et al. ............................ 24/628 |
| 5,228,202 | * | 7/1993 | Liao ........................................ 16/429 |
| 5,542,150 | * | 8/1996 | Tu ........................................ 16/113.1 |
| 5,774,994 | * | 7/1998 | Stein et al. ........................... 30/322 X |
| 5,781,964 | * | 7/1998 | Lin et al. ............................. 16/113.1 |

\* cited by examiner

*Primary Examiner*—Douglas D. Watts
(74) *Attorney, Agent, or Firm*—Rosenberg, Klein & Lee

(57) ABSTRACT

A kitchen utensil includes an upper portion, a lower portion and a strip sandwiched between the upper and the lower portion and having a utility head. The strip has a plurality of holes defined therethrough. The lower portion has a tubular portion to receive a spring and a ball therein, and the upper portion has an aperture defined therethrough so that an operation member is pivotally disposed in the upper portion and has a top extending from the aperture. The operation member has a protrusion extending downwardly therefrom which extends through one of the holes of the strip and contacts the ball. The operation member further has an arm having a tip which is inserted into another hole so that the strip is movably positioned by pushing the operation member to disengaged the tip from the hole and inserted into yet another hole.

5 Claims, 7 Drawing Sheets

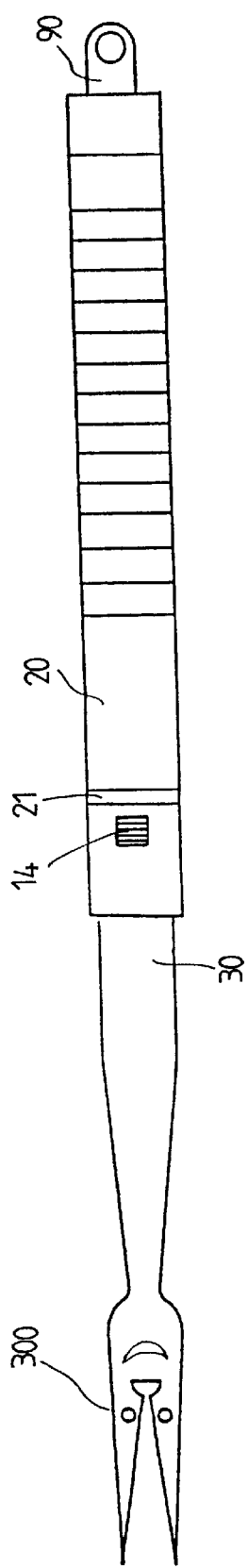
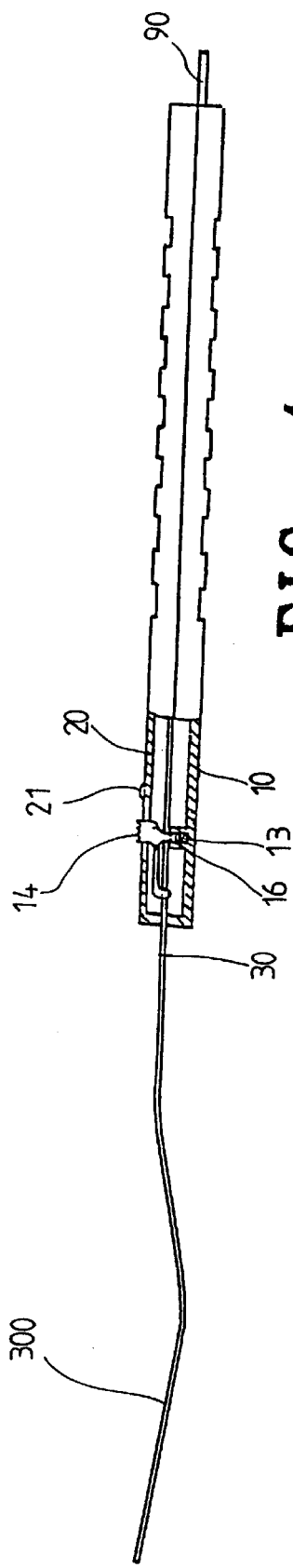

KITCHEN UTENSIL HAVING A LENGTH ADJUSTING DEVICE

BACKGROUND OF THE INVENTION

1. Field of the Invention

The present invention relates to a utensil and, more particularly, to an improved kitchen utensil having an adjusting device so as to adjust a length thereof.

2. Brief Description of the Prior Art

Kitchen utensils involve many different types of forks, turners, lifters or spoons, each of the above mentioned kitchen utensils has a handle and a utility head fixedly connected to an end of the handle. However, the length of the whole utensil is unchanged so that it is often seen many kitchen utensils are equipped with many sizes in order to be used in different situations. Therefore, a kitchen has to leave a special room to keep these kitchen utensils. Even for a fork for example, a user has to buy more than one so as to have different lengths. In fact, some of the kitchen utensils are not used so often and they occupy a lot of space. This is troublesome for those who has a small kitchen.

The present invention intends to provide an improved kitchen utensil having a length adjusting device so as to adjust a length of the kitchen utensils according to users' needs.

SUMMARY OF THE INVENTION

In one aspect of the present invention, there is provided a kitchen utensil comprising a lower portion having at least two longitudinal first flanges extending upwardly from an upper side thereof and a tubular portion extending upwardly from the upper side of the lower portion so as to receive a spring and a ball therein. An upper portion has two longitudinal second flanges extending from an underside thereof and an aperture defined therethrough which is located between the two second flanges.

An elongated strip has a plurality of holes defined therethrough and a utility head formed to one of two ends thereof. The strip is disposed between the lower and the upper portions. An operation member is disposed between the upper portion and the strip, the operation member having a top extending from the aperture and a protrusion extending downwardly therefrom so as to extend through one of the holes and contact the ball. An arm extends from the operation member and has a tip so as to be inserted into another hole.

It is an object of the present invention to provide a kitchen utensil wherein a distance between a utility head and a handle is adjustable.

It is another object of the present invention to provide a kitchen utensil which utility head is replaceable.

Other objects, advantages, and novel features of the invention will become more apparent from the following detailed description when taken in conjunction with the accompanying drawings.

BRIEF DESCRIPTION OF THE DRAWINGS

FIG. 3 is a top plan view to show the kitchen utensil of the present invention;

FIG. 4 is a side elevational view, partly in section, of the kitchen utensil of the present invention;

DETAILED DESCRIPTION OF THE PREFERRED EMBODIMENTS

Figure 1:
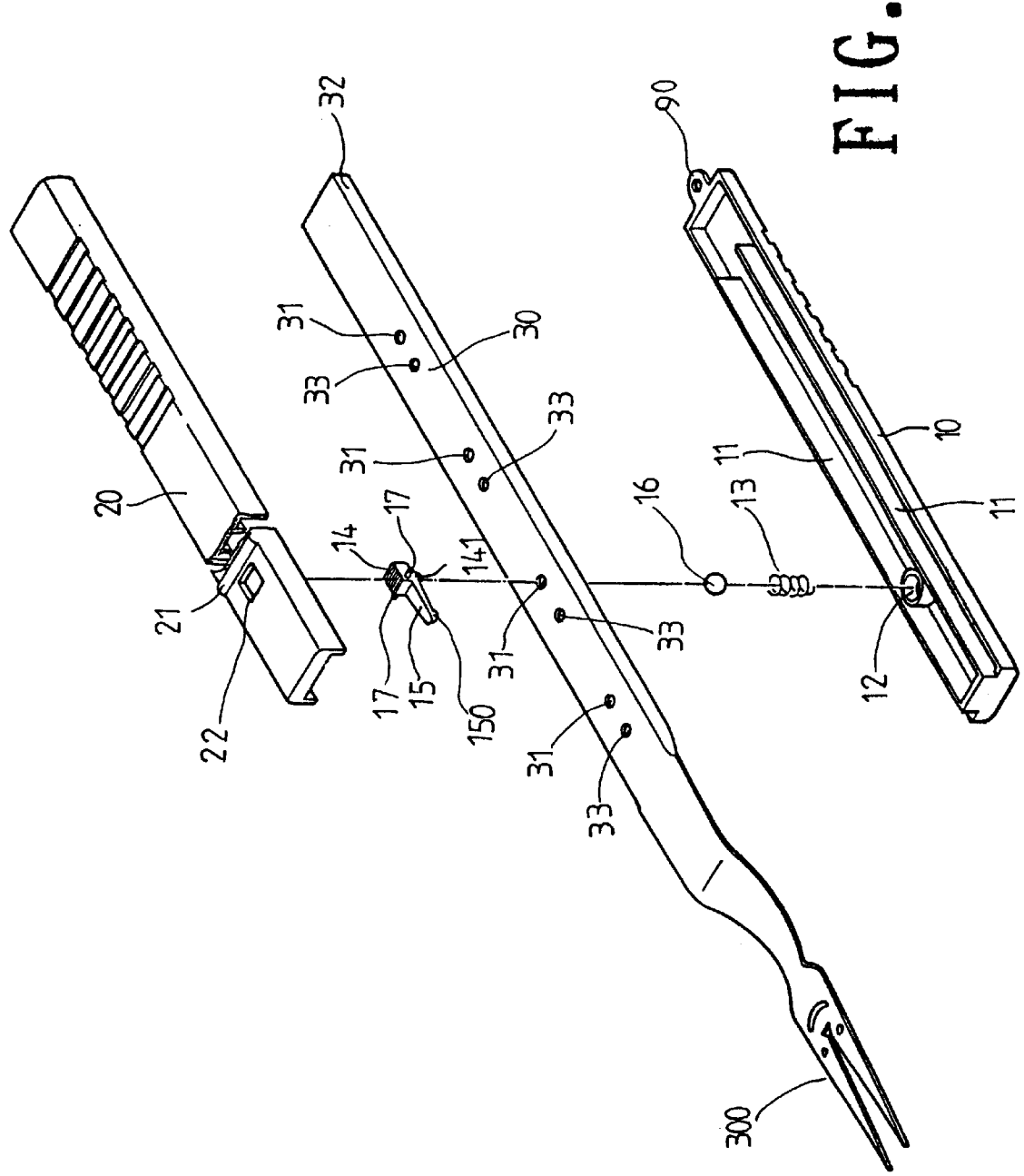
FIG. 1 is an exploded view of a kitchen utensil in accordance with the present invention.
Figure 2:
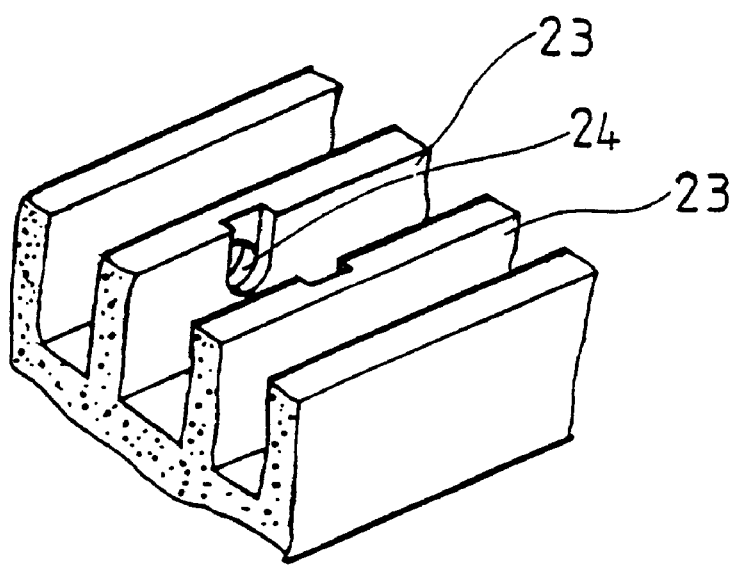
FIG. 2 is a perspective view of an upper portion the present invention so as to see an underside thereof.
Figure 5:
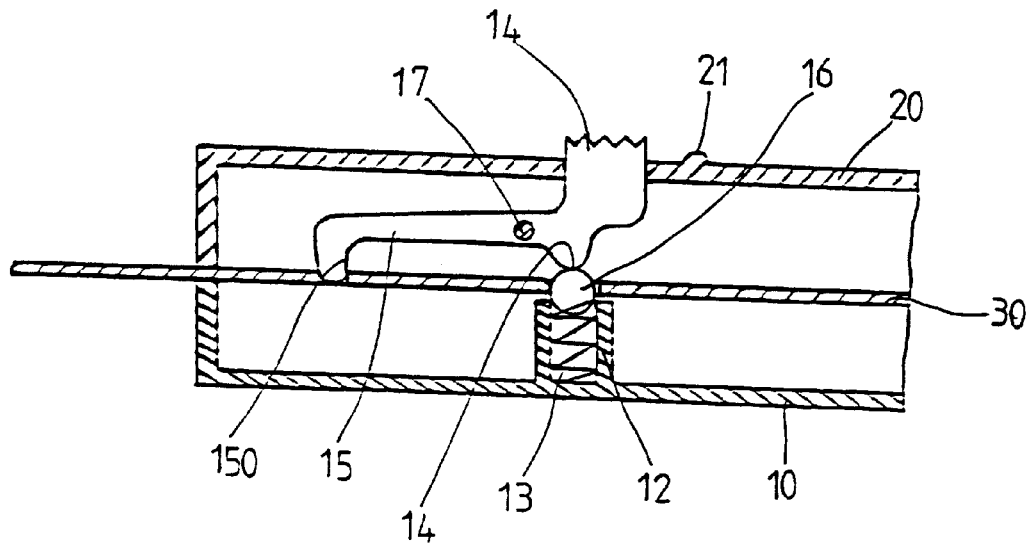
FIG. 5 is an illustrative view to show an arrangement of an operation member disposed to the kitchen utensil.

Referring to the drawings and initially to FIGS. 1 through 5, a kitchen utensil in accordance with the present invention generally includes a lower portion 10, an upper portion 20 and a metal elongated strip 30 sandwiched between the upper and the lower portion 20, 10. The lower portion 10 has at least two longitudinal first flanges 11 extending upwardly from an upper side thereof and a tubular portion 12 extending upwardly from the upper side of the lower portion 10 so as to receive a spring 13 and a ball 16 therein.

The upper portion 20 has two longitudinal second flanges 23 extending from an underside thereof and an aperture 22 defined therethrough which is located between the two second flanges 23. Each of the two second flanges 23 has a cavity 24 defined therethrough. A stop 21 extends upwardly from an upper side of the upper portion 20 and is located beside the aperture 22.

The elongated strip 30 has a plurality of first holes 31 and second holes 33 defined therethrough and a utility head 300 is formed to one of two ends thereof. The strip 30 is disposed between the first flanges 11 of the lower portion 10 and the second flanges 23 of the upper portion 20. The strip 30 further has two third flanges 32 extending laterally from two opposite sides thereof so as to be respectively disposed beside the first flanges 11 of the lower portion 10. The upper and the lower portion 20, 10 are fixedly connected to each other by a suitable manner such as by gluing, and the lower portion 10 has a ring member 90 attached to an end thereof.

An operation member 14 is disposed between the upper portion 20 and the strip 30, wherein the operation member 14 has a top extending from the aperture 22 and a protrusion 141 extending downwardly therefrom so as to extend through one of the first holes 31 and contact the ball 16. An arm 15 extending from the operation member 14 and has a tip 15 so as to be inserted into one of the second holes 33. The operation member 14 has two pins 17 respectively extending from two opposite sides thereof so as to be received in the two cavities 24.

Figure 6:
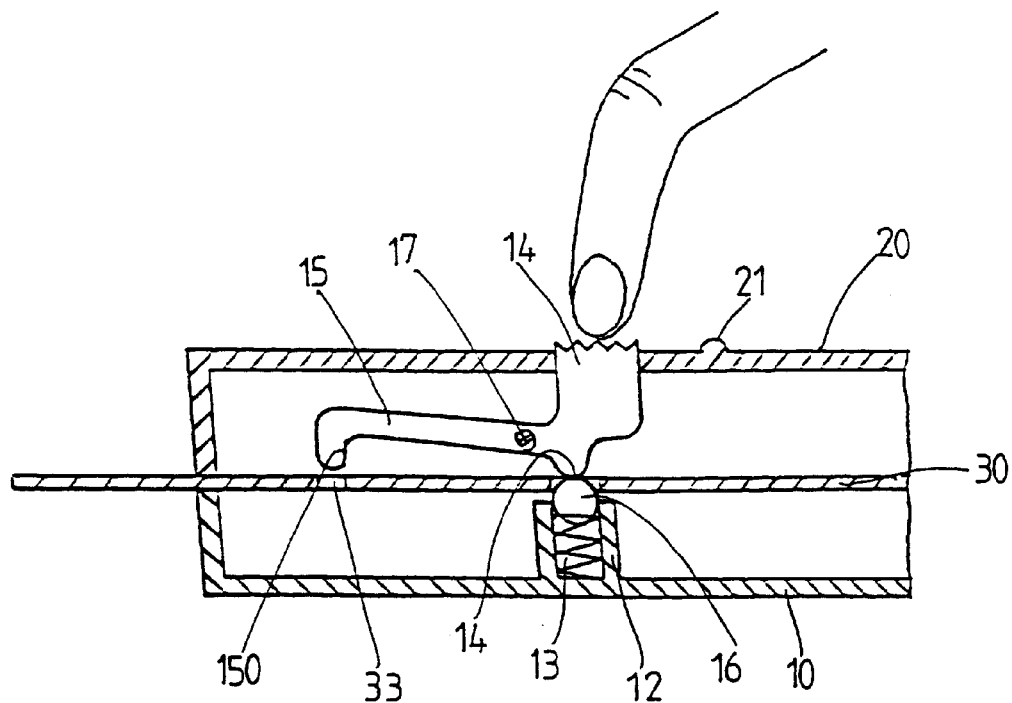
FIG. 6 is an illustrative view to show when the operation member is pushed.
Figure 7:
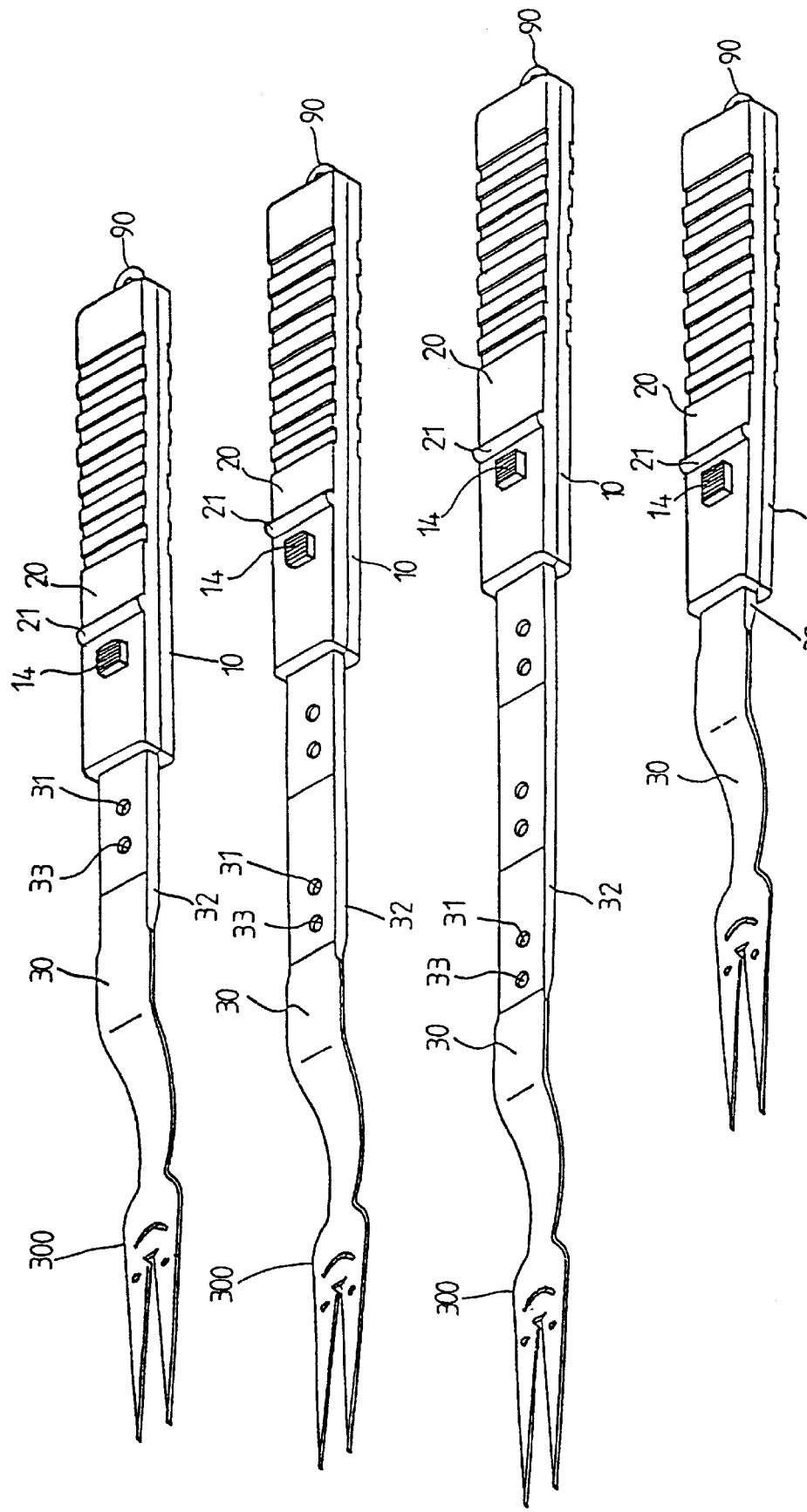
FIG. 7 is an illustrative view to show the kitchen utensil in different length status.
Figure 8:
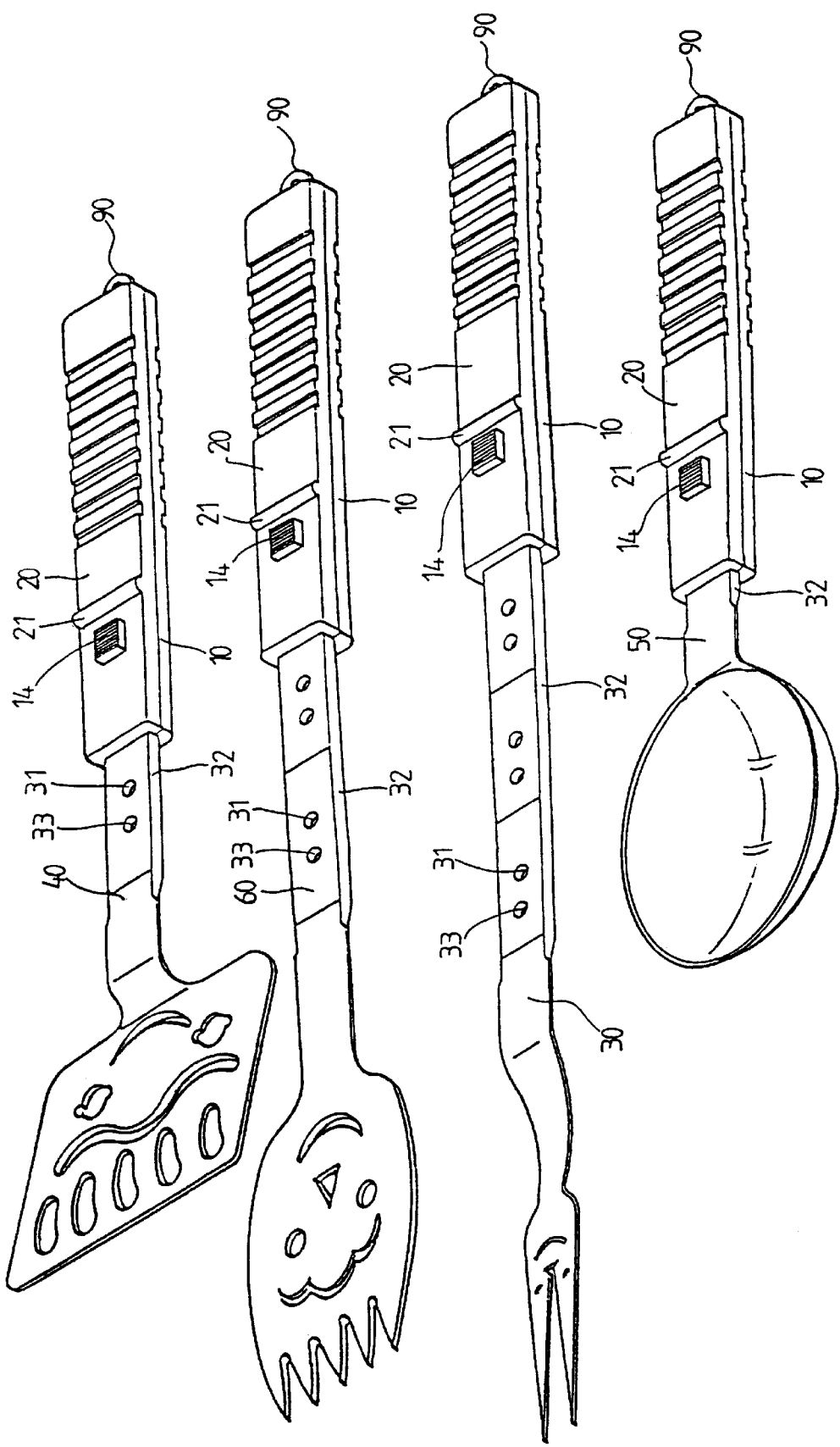
FIG. 8 is an illustrative view to show that different strips are replaceably cooperated to the kitchen utensil of the present invention.

Referring to FIG. 6, when adjusting the strip 30, a user (not shown) pushes the top 14 of the operation member 14 so as to lift the tip 150 from the second hole 33 such that the strip 30 can be moved to a desired position, and the tip 150 is then inserted into another second hole 33 to position the strip 30. Therefore, referring to FIG. 7, the strip 30 can be adjusted according to needs of the user. Of course, referring to FIG. 8, the strip 30 can be replaced with others 40–60. The stop 21 prevents from touching the top 14 unintentionally.

Figure 9:
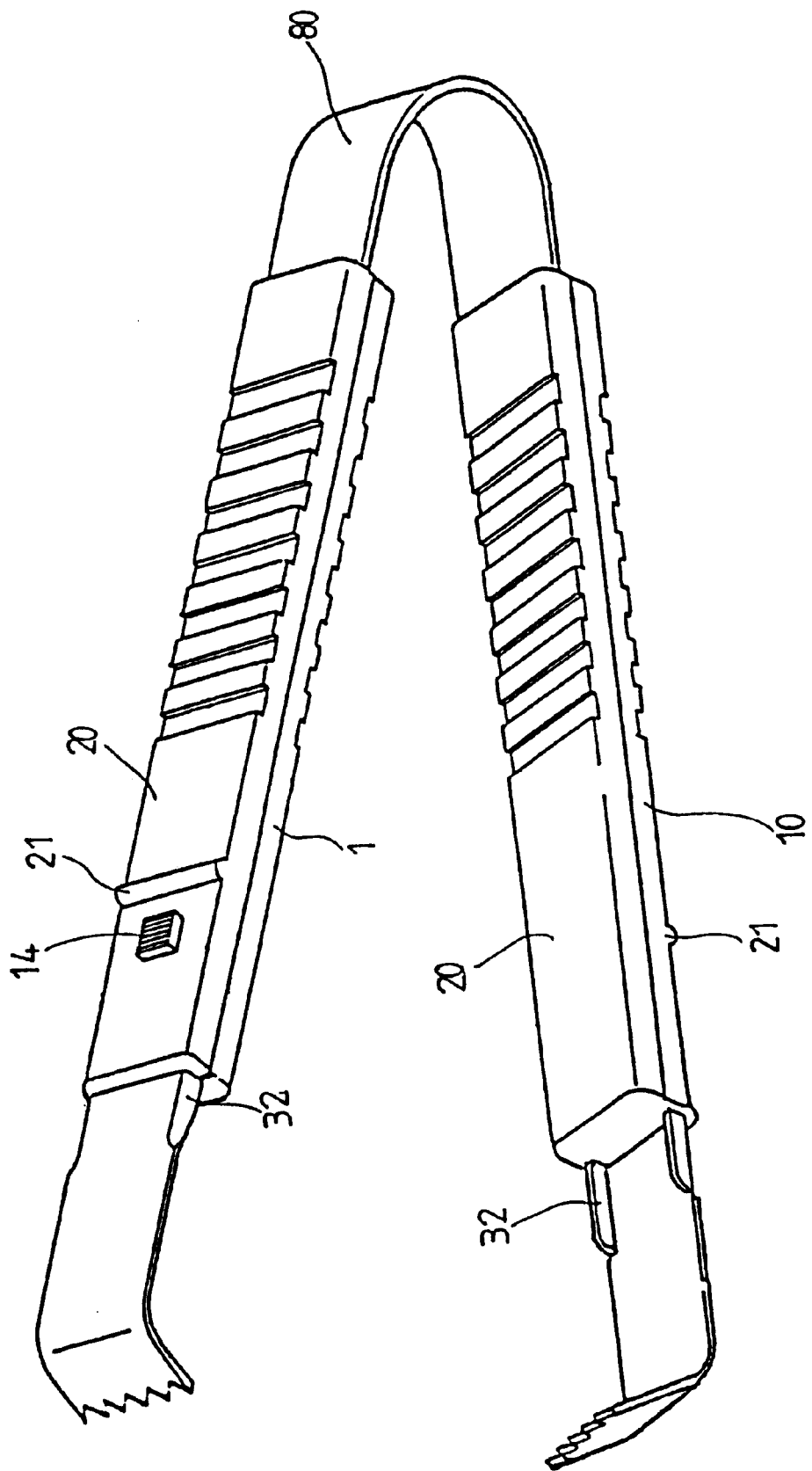
FIG. 9 is a perspective view of another embodiment of the kitchen utensil in accordance with the present invention.

Referring to FIG. 9, two kitchen utensils can be connected by a U-shaped plate 80 between two handle portions so as to form a pair of tongs or the like.

Although the invention has been explained in relation to its preferred embodiment, it is to be understood that many other possible modifications and variations can be made without departing from the spirit and scope of the invention as hereinafter claimed.

What is claimed is:

1. A kitchen utensil comprising:

a lower portion having at least two longitudinal first flanges extending upwardly from an upper side thereof, a tubular portion extending upwardly from said upper side of said lower portion;

a ball and spring for biasing said ball disposed in said tubular portion of said lower portion;

an upper portion having two longitudinal second flanges extending from an underside thereof and an aperture defined therethrough which is located between said two second flanges;

an elongated strip having a plurality of holes defined therethrough and a utility head formed to one of two ends thereof, said strip disposed between said lower and said upper portions, and an operation member disposed between said upper portion and said strip, said operation member having a top extending from said aperture and a protrusion extending downwardly therefrom to extend into one of said holes and contact said ball, an arm extending from said operation member and having a tip for insertion into another hole.

2. The kitchen utensil as claimed in claim 1 wherein said upper portion has a stop extending upwardly from an upper side thereof and is located beside said aperture.

3. The kitchen utensil as claimed in claim 1 wherein said strip is sandwiched between said first and said second flanges.

4. The kitchen utensil as claimed in claim 1 wherein said two second flanges each have a cavity defined therethrough and said operation member has two pins respectively extending form two opposite sides thereof to be received in said two cavities.

5. The kitchen utensil as claimed in claim 1 wherein said strip has two third flanges extending laterally from two opposite sides thereof so as to be respectively disposed beside said first flanges of said lower portion.

* * * * *